United States Patent [19]

Toshiaki

[11] Patent Number: 4,681,190
[45] Date of Patent: Jul. 21, 1987

[54] APPARATUS FOR CONTROLLING AN ELEVATOR

[75] Inventor: Ishii Toshiaki, Aichi, Japan

[73] Assignee: Mitsubishi Denki Kabushiki Kaisha, Tokyo, Japan

[21] Appl. No.: 818,636

[22] Filed: Jan. 14, 1986

[30] Foreign Application Priority Data

Jan. 14, 1985 [JP] Japan .................................. 60-4226

[51] Int. Cl.⁴ ............................................ G05B 15/00
[52] U.S. Cl. .................................................. 187/101
[58] Field of Search .................... 187/29 R; 371/3, 62

[56] References Cited

U.S. PATENT DOCUMENTS

| 921,646 | 5/1911 | Larson . | |
|---|---|---|---|
| 4,210,226 | 7/1980 | Ichioka | 187/29 R |
| 4,456,096 | 6/1984 | Kajiyama . | |
| 4,468,768 | 8/1984 | Sunkle et al. | 371/3 |

FOREIGN PATENT DOCUMENTS 5922869 7/1982 Japan .

OTHER PUBLICATIONS

Texas Instruments Inc. type SN 74LS123, pp. I 8-76 and I 8-77.

Primary Examiner—William M. Shoop, Jr.
Assistant Examiner—Richard K. Blum
Attorney, Agent, or Firm—Sughrue, Mion, Zinn, Macpeak, and Seas

[57] ABSTRACT

In an elevator controller employing a microcomputer (MPU) for executing several kinds of controls, the MPU supplies an operation checking signal to an MPU checking circuit simultaneously with the operation of a starting contactor or relay, and, if a response to the operation checking signal is not fed back to the MPU within a predetermined time, the MPU recognizes an abnormal condition of the MPU or of the MPU checking circuit and prohibits the elevators from starting to travel. The checking operation of the MPU and the MPU checking circuit is executed each time the starting relay or contactor operates.

11 Claims, 7 Drawing Figures

APPARATUS FOR CONTROLLING AN ELEVATOR

BACKGROUND OF THE INVENTION

This invention relates to an apparatus for controlling an elevator and, more particularly, to an elevator controller employing a microcomputer for executing several kinds of controls.

In recent years, several kinds of microcomputers or microprocessor units (hereinafter, MPUs) have been developed as the technology of semiconductors has rapidly advanced. In many industrial machines and devices, sophisticated controls are implemented by using MPUs in their control units. Since many complicated controls are required in elevator systems, elevator controls also are shifting to a control with an MPU, as shown in FIG. 7 which is similar to Japanese Application Publication 59(1984)-22869 published on Feb. 6, 1984. U.S. Pat. No. 4,456,096 also shows an elevator control system using an MPU.

In FIG. 7, input and output terminals of an MPU 1 are connected to an input-output circuit 2. Amplifier 3 amplifies output signals from an output port PO1 of the input-output circuit 2. A three-phase AC power source 4 is connected to a control circuit 6 for controlling a traction motor 8 through a contact 5a of a starting contactor or relay 5. The motor control circuit 6 controls the power supplied to the motor 8 in accordance with the output signal from the amplifier 3. Current detector 7 detects the current supplied to the motor 8 through the motor control circuit 6, and a corresponding output signal from the detector 7 is supplied to an input port PI1 of the input-output circuit 2. A speed detector 9, such as a tachometer, connected to the rotary shaft of the traction motor 8, detects the speed of the motor 8 and supplies a corresponding output signal to an input port PI2 of the circuit 2. An MPU checking circuit 10 is connected to an input port PO2 of the circuit 2 and has an output terminal connected to a relay 11. A switch 12, for commanding the travel of the elevator, is connected to an input port PI3. A check switch 13 is connected to an input port PI4 of the circuit 2 and is provided for checking the operation of the MPU checking circuit 10. A relay 14, for commanding an emergency stop of the elevator, is connected to an output port PO3 of the circuit 2.

In the operation of the above apparatus, when the starting contactor 5 for activating the apparatus is energized, the contact 5a of the contactor is closed, and the motor control circuit 6 is enabled for operation. When the command switch 12 is closed in order to start the travel of an elevator, the output signal of the switch 12 is inputted to the MPU 1 through the input-output circuit 2, and then the MPU 1 executes a calculation to calculate the difference between the output signal from the speed detector 9 and a speed reference value. The difference signal of the calculation is fed to the amplifier 3 through the input-output circuit 2 to be amplified and supplied to the motor control circuit 6 as a control signal. The motor control circuit 6 controls the power to be supplied to the motor 8 in accordance with the control signal from the amplifier 3, which signal is indicative of the difference between the rotating speed of the motor 8 and the present reference value, so that the traction motor 8 varies its speed in accordance with a predetermined speed reference pattern. When the MPU 1 detects an abnormal speed or an abnormal current, the MPU 1 operates the relay 14 by way of the input-output circuit 2 to cause an emergency stop of the elevator.

In case the MPU 1, itself, malfunctions, a very dangerous situation arises because the MPU 1 checks all controls and abnormal operations. Therefore, in an elevator control with an MPU, it is necessry also to check the operation of the MPU itself. The checking circuit 10 is provided for checking the operation of the MPU 1. When the MPU is operating normally, the checking circuit 10 continually supplies a signal to maintain relay 11 picked-up or energized. However, the checking circuit 10 stops outputting the signal when the MPU operates abnormally, so that the relay 11 drops out (is de-energized) to make the emergency stop.

Since an elevator carries human beings, it must operate absolutely safely and correctly. Accordingly, an authorized person must periodically check the operation of the MPU 1 at predetermined times. The check switch 13 is provided for checking the operation of the MPU itself.

When the check switch 13 is closed by an authorized person, an artificial signal, representing abnormal operation of the MPU 1, is fed to the MPU checking circuit 10. If the MPU checking circuit 10 is in a normal condition, the MPU checking circuit 10 operates almost simultaneously with the operation of the switch 13 to cause the relay 11 to drop out, thereby confirming the normal operation of the MPU checking circuit 10. Then, switch 13 may be re-opened to permit operation of the elevator system. If the relay 11 does not simultaneously drop out, then a fault in the MPU is indicated.

However, in the above conventional apparatus with an MPU, this manual operation check must be periodically executed at predetermined times which may be as long as a half month or a month apart, thereby requiring expensive manpower. Furthermore, there is the problem that malfunctions arising between the operation checks will not be detected.

SUMMARY OF THE INVENTION

The object of the invention is to eliminate the disadvantage of the conventional apparatus of FIG. 7 and to provide an improved elevator control apparatus which allows the travel of the elevator only in the normal condition of both the MPU and the MPU checking circuit.

In one embodiment of the invention, the MPU supplies an operation checking signal to the MPU checking circuit simultaneously with the operation of the starting contactor, and, if a condition exists in which a response to the operation checking signal is not fed back to the MPU within a predetermined time, the MPU recognizes such a condition as an abnormal condition of either the MPU or the MPU checking circuit and prevents the elevator from starting to travel.

In the control circuit above mentioned, the checking operation of the MPU or the MPU checking circuit is executed each time the starting contactor operates. Therefore, the checking operation is automatically executed, and the safeness of the elevator is remarkably increased as compared to the conventional control circuit of FIG. 7.

DESCRIPTION OF THE PREFERRED EMBODIMENT

Figure 1:
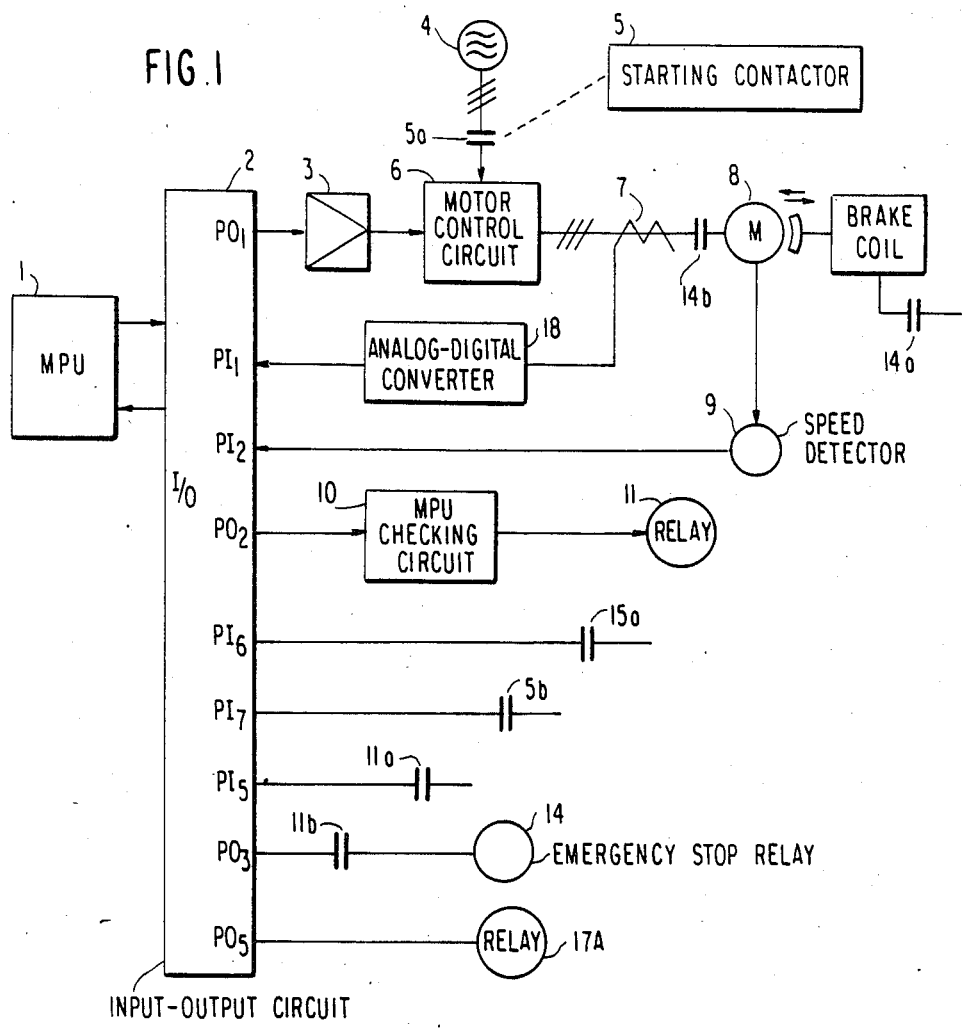
FIG. 1 is a circuit diagram showing a preferred embodiment of the elevator control apparatus of the invention.
Figure 2:
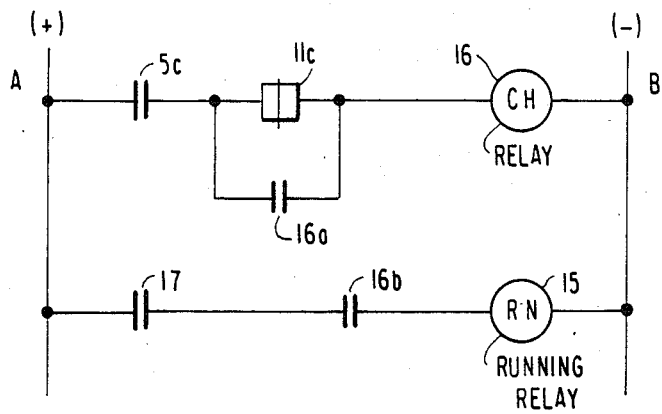
FIG. 2 is a circuit diagram showing a preferred checking circuit in the elevator control apparatus.
Figure 3:
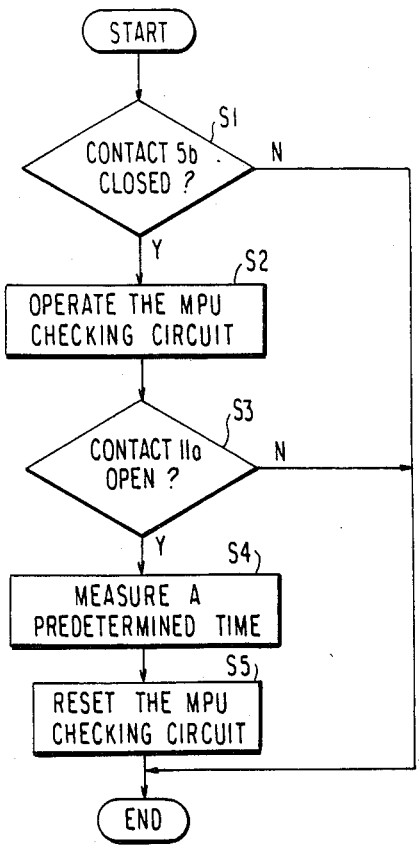
FIG. 3 is a flow chart showing the operation of an MPU in the checking mode.
Figure 7:
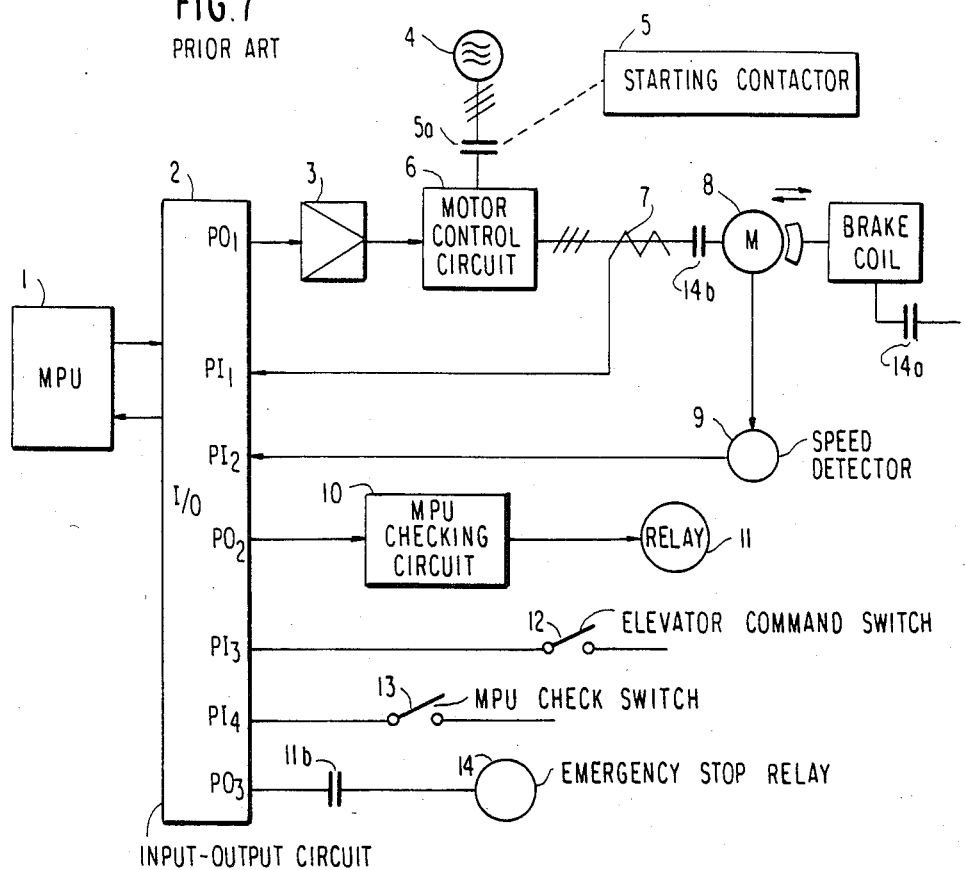
FIG. 7 is a circuit diagram showing the conventional elevator control apparatus.

In FIGS. 1 and 2, elevator control circuits according to a preferred embodiment of the invention are shown, and similar or corresponding elements to those in FIG. 7 are designated with the same reference numerals.

INTEL 8085A by INTEL Corp. is employed as the MPU 1, INTEL 8155 by INTEL Corp. as the input-output circuit 2, DAC85 by BURR-BROWN RESEARCH Corp. as the amplifier 3, ADC0800 by NATIONAL SEMICONDUCTOR Corp. as an analog-digital converter 18 and SN74ls123 by TEXAS INSTRUMENTS Inc. as the MPU checking circuit 10.

With reference to FIGS. 1 and 2, contact 15a is the contact of a running relay (RN) 15 which is energized for running an elevator cage, and which supplies to the input port PI6 of the input-output circuit 2 a signal representing the operation of the running relay 15 when the running relay is energized. Contact 5b is one contact of the starting contactor 5 which is energized to energize or enable the motor control circuit in preparation for the running of the elevator cage and which supplies to an input port PI7 of the circuit 2 a signal representing the operation of the starting contactor when the contactor is energized to close the contact 5b. Contact 11a is one contact of a relay 11 connected to the output of the MPU checking circuit 10 and, when closed, supplies to an input port PI5 of the circuit 2 a signal representing the operation of the relay 11 when the relay 11 is energized. Contact 11b is a normally open contact of relay 11 and is connected to relay 14, which commands the emergency stop when dropped out or de-energized, and which maintains normal travelling opration of the elevator when piced up or energized. Thus, relay 11, contacts 11b and a stop relay 14 function as an emergency stop means for preventing travel of the elevator. When the relay 14 is energized, contacts 14a and 14b are closed to supply the controlled power to the motor 8 and to release a braking device by energizing a brake coil.

In FIG. 2, there is shown a monitoring circuit for monitoring or checking the MPU checking circuit 10 itself. The monitoring circuit is separate from the circuit in FIG. 1 and is connected across lines A and B of a D.C. power supply derived from the A.C. power source 4. A relay 16 is connected to D.C. lines A and B through its normally open holding contact 16a, the normally open contact 5c of the starting contactor and the normally closed contact 11c of the running relay 11. The contactor 11c is in parallel with the contact 16a. The running relay 15 is connected to the power lines A and B through a normally open contact 16b of the relay 16 and the contact 17 of a contactor 17A in FIG. 1. The contactor 17A is energized to close the contact 17 when the output of an output port PO5 is energized, which output is generated when the door of the elevator cage having a call is closed.

In operation, when the starting contactor is picked up, its contact 5b is closed to supply the MPU 1 the signal representing the operation of the starting contactor through the input port PI7 of input-output circuit 2. The MPU starts an operating mode for driving the MPU checking circuit 10 and executes an operation as shown in the flow chart of FIG. 2.

In step S1, the closing operation of the contact 5b is checked, and, if the contact has not closed (NO), the checking operation is continued. After the contact 5b is closed by the operation of the starting contactor, the result of the checking becomes YES, and the operation moves to step S2.

Figure 6:
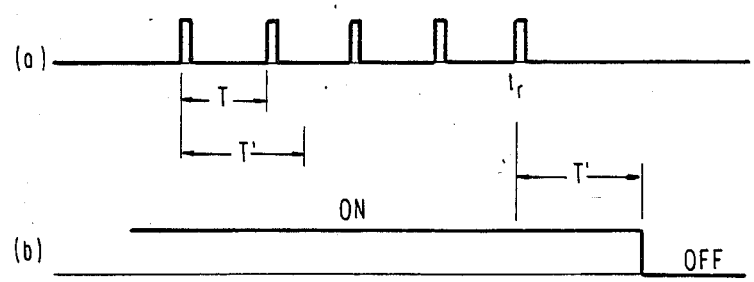
FIG. 6 is a timing diagram of the operation of the checking circuit of FIG. 2.

In step S2, the MPU 1 puts the MPU checking circuit 10 in operation; that is, the checking circuit 10 is artificially put into the condition of detecting an abnormality in the MPU. More specifically, MPU checking circuit 10 receives a series of periodic pulse signals with a predetermined period T, as shown in FIG. 6(a), from the MPU. The MPU checking circuit 10 starts to count for a predetermined time interval T' each time the circuit 10 receives a pulse signal. The interval T' is longer than the period T. If the next pulse signal is supplied to the circuit 10 within the predetermined time interval T', the circuit 10 generates a signal for energizing the relay 11. On the other hand, if the next pulse signal is not supplied within interval T', the circuit 10 stops generating the energizing signal to the relay 11 when the time T' expires or is counted after the last pulse signal tn. In step S2, the MPU tentatively stops supplying the pulse signals and puts the checking circuit 10 into the abnormal operation mode.

In step S3, the opening operation of the contact 11a is checked, and, if the result of the checking is NO, the checking operation is continued. However, when the contact 11a is opened, the result of step S3 becomes YES, and the operation moves to the next step S4.

In step S4, a predetermined constant time is measured, and the operation moves to the next step S5. The reason for measuring time in step S4 is that there is a small time delay until the relay 16 is picked up after the relay 11 is dropped out, and it is necessary to set a time to compensate for the delay. Without step S4 the circuit in FIG. 2 does not operate in the intended sequence; that is, if step S5 (the reset of circuit 10) were executed immediately after the relay 11 is dropped out, contact 11c would not yet have returned to its normally closed state, and the relay 16 is not picked up yet and the holding contact 16b is still open.

In step S5, the MPU checking circuit 10 is reset into the normal operation mode from the tentative abnormal operation mode, and the checking operation of the MPU is ended.

When the MPU checking circuit 10 is put into the artificial abnormal condition, the MPU checking circuit 10 stops generating the signal for energizing the relay 11 and the relay 11 drops out to open the contacts 11a and 11b and to close the contact 11c in FIG. 2. At this moment the contact 5c is still closed because the starting contactor is in operation. Accordingly, the relay 16 is picked up to close its holding contact 16a for maintaining relay 16 in the picked-up or energized condition after the contact 11c has opened.

Figure 4:
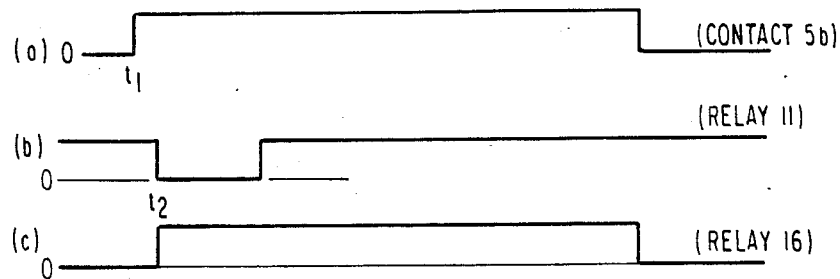
FIGS. 4(a) through 4(c) and 5(a) through 5(c) are waveforms showing the timing of the operation of a contactor contact and relays in the circuits of FIG. 1 and FIG. 2.

In the normal condition of the MPU, the MPU checking circuit 10 or the relay 11, when the starting contactor or relay 5 is energized at the time t1 in FIG. 4(a), the contact 5b is simultaneously closed to generate the signal to the MPU for starting the checking mode operation of the MPU. The MPU starts the operation to put the MPU checking circuit 10 into the artificially abnormal condition, and the relay 11 is supposed to be dropped out at the moment t2 in FIG. 4(b). When the relay 11 is dropped out, the normally closed contact 11c is closed to maintain the picked-up or energized condition of the relay 16 as shown in FIG. 4(c). Accordingly, the contact 16b is kept closed, thereby indicating that the respective elements are in the normal condition, and the running relay 15 is energized in accordance with the running command from the circuit 17 to enable the running of the elevator cage.

Figure 5:
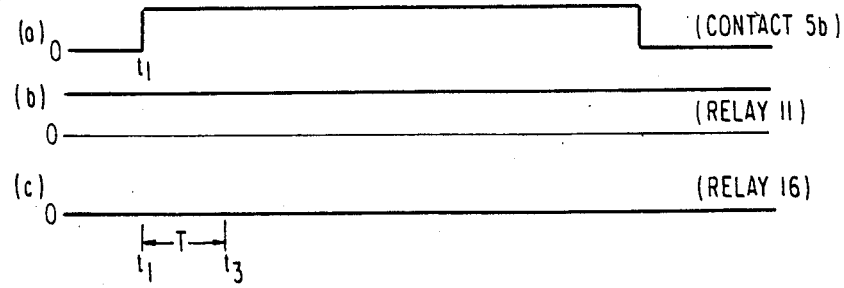

On the other hand, in the abnormal condition of the MPU, the MPU checking circuit 10 or the relay 11, although the starting contactor is picked up at the moment t1 in FIG. 5(a), the relay 11 is not dropped out, as shown in FIG. 5(b). Consequently, the relay 16 cannot be energized or picked up, because the normally open contact 11c is not closed. Since the contact 16b also is open, the running relay 15 is prevented from being energized in spite of the generation of a starting command from circuit 17. The safeness of the elevator is thus established.

If the relay 11 is dropped out by a certain cause, the relay 16 is picked up. However, the contact 11b opens to de-energize the relay 14, and the elevator makes an emergency stop.

As described above, the elevator control apparatus in the present invention is constructed so as to prohibit the travel of the elevator when a predetermined response does not arise after putting the MPU checking circuit into the artificially abnormal condition simultaneously with the energization of the starting contactor. Accordingly, a safety check is automatically executed each time the starting contactor 5 is picked up or energized, and the safeness of the elevator is remarkably increased in comparison with conventional elevator control systems.

While preferred embodiments of the invention have been described in the foregoing specification and illustrated in the attached drawing, it is to be understood that obvious variations of these preferred embodiments will become apparent to those of ordinary skill in the art and that the scope of the invention is limited only by the following claims.

I claim:

1. An elevator control system having a control circuit means for receiving input signals indicative of malfunctions within the elevator control system and for issuing a control signal to cause an elevator to travel in response to a command signal when no malfunctions exist, and comprising:

starting switch means operable to energize said control circuit means;
   checking circuit means, responsive to each operation of said starting switch means, for automatically detecting whether the energized control circuit means is operating in a normal or abnormal mode and for generating a first signal indicative of the abnormal mode;
   emergency stop means, responsive to said first signal, for preventing travel of the elevator; and
   monitoring circuit means, also responsive to the operation of said starting switch means, for automatically detecting whether said checking circuit means is operating in a normal or abnormal mode and for preventing the issuance of said control signal and travel of said elevator if an abnormal mode of said checking circuit means is detected;
   said control circuit means, after energization thereof by the operation of said starting switch means, automatically applying to said checking circuit means an artificial signal indicative of an abnormal mode of said control circuit, and said monitoring circuit means detecting a normal mode of said checking circuit means if said checking circuit means detects an abnormal mode of said control circuit means within a predetermined time after the application of said artificial signal.

2. A control system as defined in claim 1 wherein said control circuit means comprises a microprocessor unit whose normal and abnormal mode of operation are detected by said checking circuit means.

3. An elevator control apparatus for checking the operation of a control circuit which controls an elevator, comprising starting switch means operable for putting the circuit into operation;
   checking circuit means for detecting whether or not said control circuit is operating in a normal manner and for generating a signal representing an abnormality in the operation of the control circuit if an abnormality is detected;
   monitoring circuit means operable to detect whether or not said checking circuit means is operating in a normal manner and for prohibiting traveling of the elevator if an abnormality of said checking circuit means is detected, said monitoring circuit means being operated by the operation of said switch means; and
   said control circuit comprising means for applying an artificial signal representing an abnormality of said control circuit to said checking circuit means after the operation of said starting switch means, whereby said monitoring circuit means is operated to detect the operation of said checking circuit means in response to the application of said artificial signal.

4. An elevator control apparatus as defined in claim 3 further comprising means for generating a running signal for the elevator, wherein said monitoring circuit means prevents said means for generating a running signal from operating when an abnormality of said checking circuit means is detected, and allows said running signal generating means to operate when a normality of said checking circuit means is detected.

5. An elevator control apparatus as defined in claim 3, wherein said monitoring circuit means executes the monitoring operation during a period between the operation of said starting switch means and the start of travel of the elevator.

6. An elevator control apparatus as defined in claim 3, further comprising control means operable by an output signal from said checking circuit means, said control circuit receiving a signal generated by said control means after the operation of said control means to confirm the operation of said control means to inhibit said means for applying the artificial abnormal signal.

7. An elevator control apparatus as defined in claim 6, wherein said control circuit stops generating the artificial signal after the lapse of a predetermined time after the operation of said control means.

8. An elevator control apparatus as defined in claim 7, wherein said predetermined time is set on the basis of the necessary time for confirming the operation of said control means.

9. An elevator control apparatus as defined in claim 7, wherein said control circuit resets said checking circuit means into a normal operation mode.

10. An elevator control apparatus as defined in claim 6, wherein said control means operates so as to cause an emergency stop of the elevator when said signal indicating said abnormality is generated by said checking circuit means.

11. An elevator control apparatus as defined in claim 3 wherein said control circuit comprises a microprocessor unit whose normality and abnormality is detected by said checking circuit means.

* * * * *